(12) United States Patent
Moxson et al.

(10) Patent No.: US 7,566,415 B2
(45) Date of Patent: Jul. 28, 2009

(54) METHOD FOR MANUFACTURING FULLY DENSE METAL SHEETS AND LAYERED COMPOSITES FROM REACTIVE ALLOY POWDERS

(75) Inventors: Vladimir S. Moxson, Hudson, OH (US); Eugene Ivanov, Grove City, OH (US)

(73) Assignee: ADMA Products, Inc.

( * ) Notice: Subject to any disclaimer, the term of this patent is extended or adjusted under 35 U.S.C. 154(b) by 0 days.

(21) Appl. No.: 10/298,849

(22) Filed: Nov. 18, 2002

(65) Prior Publication Data

US 2004/0096350 A1 May 20, 2004

(51) Int. Cl.
 *C22C 1/04* (2006.01)
(52) U.S. Cl. .................. 419/48; 419/5; 419/8; 419/26; 419/38; 419/49; 419/60; 428/548
(58) Field of Classification Search ...................... 419/5, 419/6, 8, 60, 48
See application file for complete search history.

(56) References Cited

U.S. PATENT DOCUMENTS

| | | | | | |
|---|---|---|---|---|---|
| 4,917,858 | A | * | 4/1990 | Eylon et al. | 419/28 |
| 5,024,813 | A | * | 6/1991 | Nishiyama | 420/402 |
| 5,395,699 | A | * | 3/1995 | Ernst et al. | 428/547 |
| 5,427,735 | A | * | 6/1995 | Ritter et al. | 419/47 |
| 5,863,398 | A | * | 1/1999 | Kardokus et al. | 204/298.13 |
| 6,030,472 | A | * | 2/2000 | Hajaligol et al. | 148/651 |
| 7,387,763 | B2 | * | 6/2008 | Kelly | 419/29 |

* cited by examiner

*Primary Examiner*—Roy King
*Assistant Examiner*—Christopher S Kessler

(57) ABSTRACT

The method is suitable for the manufacture of flat or shaped titanium aluminide articles and layered metal matrix composites such as lightweight plates and sheets for aircraft and automotive applications, thin cross-section vanes and blades, composite electrodes, heat-sinking lightweight electronic substrates, bulletproof structures for vests, partition walls and doors, as well as for sporting goods such as helmets, golf clubs, sole plates, crown plates, etc. The method includes the following steps: (a) forming a porous preform of the reactive powder alloy or a porous multi-layer composite preform consisting of reactive powder metals and alloys by consolidation using at least one method selected from low-temperature loose sintering in vacuum, high-temperature loose sintering in vacuum, low-pressure sintering in an inert gas, cold pressing, direct powder rolling, isostatic or die pressing, and other means of room temperature and warm temperature consolidation, and/or combination thereof, to provide the density not less than 25% from the theoretical density of said reactive alloy; (b) hot consolidating by hot pressing said preform, hot rolling, hot isostatic pressing, or hot extrusion to obtain the density of 98-100% from the theoretical density of said reactive alloy; (c) additional sintering and/or annealing at the temperature being at least 900° C. to decrease the residual porosity, control the microstructure, and improve the mechanical properties, especially ductility and/or plasticity of the resulting metal sheets or layered composites. The hot pressing is carried out at the temperature ranging 950-1700° C., preferably at 1250-1450° C., and at pressure ranging 50-350 kg/cm². The HIP is carried out at the temperature ranging 1250-1350° C. and at pressure ranging 15000-40000 psi. The layered composite preform is manufactured by individual loose sintering, one layer of the composite at a time, and assembling them in the desired order. The composite consists of layers of titanium and/or titanium hydride, Ti-6Al-4V alloy, α-titanium aluminide alloy, β-titanium aluminide alloy, and γ-titanium aluminide alloy in any combinations.

18 Claims, No Drawings

METHOD FOR MANUFACTURING FULLY DENSE METAL SHEETS AND LAYERED COMPOSITES FROM REACTIVE ALLOY POWDERS

FIELD OF THE INVENTION

The present invention relates to methods for manufacturing thin dense metal sheets, foils and layered composites from various powders to produce numerous combinations of reactive metals (initially in sintered powder form) with or without ductile layers or high-ductile layers. More specifically, the invention relates to a method which employs a combination of loose sintering, hot axial pressing, hot isostatic pressing, and/or hot rolling to form a dense solid microstructure of reactive alloys especially titanium aluminides and composites comprising titanium aluminides, CP titanium, and/or titanium alloys.

The present invention is extremely useful in the production of thin sections of low ductile alloys, which oxidize rapidly at elevated temperatures. In addition to the metals set forth in the background of the invention, this invention is particularly useful in forming thin sheets, strips, and layered composites of pure titanium, titanium alloys, and titanium aluminide both single-phase and multi-component alloys. Many other pure metals and numerous reactive alloys will also be suitable for metal forming by method of the present invention.

BACKGROUND OF THE INVENTION

The aim of the invention is low cost production process of metals and alloys, which are reactive at high temperature in the manufacturing cycle. Reactive alloys might be determined as alloys that exhibit an increase in chemical interaction with oxygen, nitrogen, carbon, etc. at elevated temperatures. Titanium aluminide, high strength titanium alloys, nickel aluminide, beryllium alloys, refractory metals, zirconium alloys, niobium, and other metals represent the group of such reactive alloys. Thin sheets or foils of reactive metals such as titanium aluminides are used for manufacturing important structural elements ideally designed for aircraft and space applications, where high service temperature and high strength-to-density components are required. However, the fabrication of such products as thin gage gamma-titanium aluminide sheet and foil is extremely difficult because of their inherent low ductility. In addition, oxidation of these alloys is drastically increased at elevated temperatures that significantly hinder hot forming of foil or thin sheet. Also, the undesired diffusion of a gas into a metal surface produces a decrease in ductility.

The aerospace industry continues to strive for larger production yields while reducing production costs, providing processing stability, and increasing the uniformity of microstructure of single-phase or multi-component titanium aluminide alloys.

The need for elevated temperatures during reactive metal processing has produced a number of previous techniques, which eliminate oxidation atmospheres from the environment of the metal during high-temperature processing. For example, hot working in large vacuum chambers or in inert gas environments is a common technique. However, the costly manufacturing facilities, which are required in these processes, add additional expenses to the final product. In many applications, an oxide layer is removed from a metal section by machining or the like.

Many technologies, known for manufacturing thin sections or foils of reactive metals, incorporate special coatings, claddings, or capsules that protect the reactive metal workpieces from oxidation and degradation during the hot forming process. For instance, in U.S. Pat. No. 3,164,884 to Noble et al., a method for the multiple hot rolling of sheets is disclosed, in which cover plates and sidebars are assembled around inner reactive metal plates separated by a release agent. The sidebars are welded to the cover plates and to each other along their outer edges. The release (separating) agents are water mixtures of aluminum, chromium, or magnesium oxides. Additionally built-in vent holes permit gases that are formed in the package to escape during the hot rolling process.

In U.S. Pat. No. 5,121,535 to Wittenauer et al., a method of forming a reactive metal workpiece was created, which is protected from high-temperature oxidation during hot working by placing the workpiece in a malleable metal enclosure with a film of release agents interposed between major mating surfaces of the reactive metal section and the metal jacket. In a preferred embodiment, a metal section of a reactive metal is placed in a non-reactive metal frame. The reactive metal section and frame are then interposed between non-reactive metals of the top and bottom plates, with a release agent which exhibits viscous glass-like properties at high temperatures being disposed at the interfaces of the reactive metal sections. The release agent is provided preferably in shallow depressions or pockets in the non-reactive sections where the metal interfaces. The assembly is then welded together near the perimeter so that the release agent is sealed in place between the sections.

The welded assembly may then be hot rolled under pressure to the desired gauge using conventional hot rolling machinery and procedures to form thin metal sections or foils. Other hot working techniques may be employed where suitable. As the assembly is hot rolled, the release agent flows to form a uniform interfacial film. Thus, accelerated oxidation during the high-temperature hot working of the reactive metal section is prevented using the present invention, by encapsulating the reactive metal section in a non-reactive metal jacket during hot working, with the major surfaces of the reactive metal core being separated from the encapsulant layers by a release agent.

Thereafter, the formed assembly or laminate is cooled, and the rolled assembly is sheared to remove the welded edges. The non-reactive metal sections are simply peeled from the reactive metal core by virtue of the presence of the brittle, non-cohesive release agent. Residual release agents can be removed from the finished reactive metal foil by a rinse. In this manner, U.S. Pat. No. 5,121,535 provides a method by which bulk quantities of reactive metals, such as refractory metals, can be formed into thin metal sections such as foils or strips without the use of vacuum processing equipment and with the utilization of conventional hot working equipment such as hot rolling machinery.

W. J. Truckner and J. F. Edd (U.S. Pat. No. 5,405,571) proposed a combination of tape casting and consolidation by hot pressing to manufacture thin sections from powders of titanium alloys, titanium aluminides, nickel aluminides, and molybdenum disilicide. The main drawback of this method is residual porosity that is present in the final alloy due to of traces of the polymer binder used in tape casting.

The U.S. Pat. No. 5,863,398 provides the manufacture of reactive alloys by hot pressing followed with sintering under pressure of 3000-5000 psi at 1300-1500° C. The method is characterized by low productivity and density gradient along the resulting thin material. This density gradient is caused by an error in parallelism between the punch and matrix of the hot pressing die that always exists in the procedure.

K. Shibue with coworkers reported on the manufacture of shaped TiAl alloy by cold extrusion of an elemental powder blend in an aluminum can followed by hot isostatic pressing (U.S. Pat. No. 5,372,663). This method can only be used only to produce symmetric articles, e.g., rod-like, but it is not suitable for thin sheets or strips.

U.S. Pat. No. 6,240,720 to Tseng, et al. discloses a multilayer hybrid composite material formed as an elongated hollow cylindrical shell. The shell has a structure of inner and outer rims made from titanium alloy and a reinforcing layer of silicon carbide fibers between titanium rims. Mechanical properties and the reliability of such type of composites depend on the completion of the interface reaction between metal and ceramic fibers. Unfortunately, this reaction and the metal-ceramic bond strength are not controllable by parameters of the composite processing.

U.S. Pat. No. 4,816,347 to Rosental, et al. discloses a manufacture of hybrid titanium matrix composite comprising layers of titanium alloy and titanium aluminide reinforced by silicon carbide fibers. The composite is fabricated by CVD or PVD deposition of titanium aluminide layer on silicon carbide filaments, and layering these with Ti-6Al-4V alloy foils followed by HIP consolidation at 1700-1800 F. The vapor deposition involved in the manufacture constrains a thickness of the aluminide layer by microns, and significantly increases production costs. The contribution of thin aluminide films regarding strength of the composite structure is insignificant.

All previous technologies of fabricating thin sheets or foils from reactive alloys have considerable drawbacks, which make them undesirable in terms of sufficient protection from oxidation, cost, and production capacity, especially if the thin sections were produced initially from reactive alloy powders, which require additional hot working cycles for compacting. The resulting porosity causes very rapid oxidation of the reactive alloy to a substantial depth, and capsules designed in known inventions do not protect the sintered section from rapid oxidation. A significant difference in structures and mechanical properties between sintered sections, produced from reactive powder metal, and the frame (capsule), produced from non-reactive wrought metal, result in non-uniform deformation and stress concentration of the laminate package during the hot rolling process. Cracks occur in various areas of the sintered section during the first cycles of hot rolling and do not allow it to maintain a stable manufacturing process.

Therefore, it would be desirable to provide a cost-effective method of producing thin metal sections from powder reactive alloys, which reduces or eliminates destructive oxidation during high-temperature processing. The present invention achieves this goal by providing a method by which the powder of reactive metals can be formed into fully-dense thin sheets in a hot working process combining loose sintering, hot axial pressing, hot isostatic pressing, and/or longitudinal hot deformation followed by specified heat treatment.

OBJECTS OF THE INVENTION

It is therefore an object of the invention to form an homogeneous, fully-dense, essentially uniform structure of sheets, strips, and layered metal composites of reactive alloys providing sufficient values of such mechanical characteristics as elongation, toughness, flexure and impact strength.

Another object of the present invention is to control the structure of those sheets and layered metal composites by the formation of the predetermined structure of the compacted porous preform, and then, an equi-axial microstructure of hot pressed or HIPed metals that will allow mechanical properties in the final product to be controlled.

It is yet another object of the invention to establish a continuous cost-effective process to produce thin fully dense sheets, strips, foils, and layered metal composites from reactive alloys, especially based on single-phase and multi-component titanium aluminide alloys.

The nature, utility, and further features of this invention will be more clearly apparent from the following detailed description with respect to preferred embodiments of the invented technology.

SUMMARY OF THE INVENTION

The invention relates to the manufacture of thin dense metal sheets, strips, foils and layered composites from reactive metals especially based on single-phase and multi-component titanium aluminide alloys initially in sintered powder form. While the use of a number of technologies for hot consolidation has previously been contemplated in the titanium aluminide industry as mentioned above, problems related to production costs, a process stability, defective microstructure, residual porosity, and insufficient mechanical properties of thin titanium aluminide sheets and layered composites, have not been solved.

The invention overcomes these problems by (1) consolidation by low-temperature loose sintering of powders (e.g., atomized or obtained by any other methods) of reactive alloys or blended elemental powders to obtain the porous preform having a density of 25-75% of the theoretical value, (2) hot pressing and HIP said porous structure to obtain a sheet having density of 98-100% with the equi-axial fine-grained microstructure, and (3) additional sintering and/or final diffusion annealing at the temperature at least 900° C. to decrease residual porosity, control the microstructure, and improve mechanical properties especially ductility and/or plasticity of the resulting metal sheets.

Consolidation of powders before hot deformation can also be carried out by any one method selected from loose sintering, low-pressure sintering, cold pressing, direct powder rolling, isostatic or die pressing, and other means of room temperature and warm temperature consolidation.

In another aspect of the invention, a technology is provided to manufacture fully-dense layered metal matrix composites in the form of flat or shaped lightweight construction articles consisting of at least two layers of titanium and/or titanium hydride, Ti-6Al-4V alloy, α-titanium aluminide alloy, γ-titanium aluminide alloy, or multi-component titanium aluminide alloys in any combinations.

In essence, the core of the invention is to control the composite microstructure using (a) loose sintering, (b) customized deformation by hot pressing and/or HIPing, (c) alloying or modifying the titanium aluminide or metal composite structures, and (d) heat treatment realizing diffusion healing of the residual porosity, grain bonding, and dispersion-strengthening. The controlled microstructure results in the significant improvement of mechanical properties of the thin sheets, strips, or layered composite materials.

The method allows the control of the microstructure of the thin titanium aluminide sheets and multilayer composites by changing parameters of hot pressing, HIPing, and heat treatment. The method is suitable for the manufacture of flat or shaped titanium aluminide articles and metal matrix composites having improved mechanical properties such as lightweight plates and sheets for aircraft and automotive applications, thin cross-section vanes and blades, composite electrodes, heat-sinking lightweight electronic substrates, bulletproof structures for vests, partition walls and doors, as well as for sporting goods such as helmets, golf clubs, sole plates, crown plates, etc.

The above mentioned and subsequent objects, features and advantages of our invented technology will be clarified by the following detailed description of preferred embodiments of the invention.

DETAILED DESCRIPTION AND PREFERRED EMBODIMENTS OF THE INVENTION

As discussed, the present invention relates generally to the manufacture of sintered titanium alloys using pre-alloyed powders (obtained by atomization or any other methods), elemental metal powders, and/or titanium hydrides or combinations thereof (i.e. combination of pre-alloyed, elemental and/or hydrides powders as raw materials). The uniformity of density and microstructure play a very important role in such processes, as well as the completion of diffusion bonding between powder particles that are being consolidated during the heating, hot deformation, and sintering.

No previously known methods, also mentioned in References, tried to find the optimal ratio between the density of previously compacted powders and the density obtained after hot deformation and sintering. Most of the known methods use just a powder mixture of an atomized alloy or elemental powder blend as a starting material for hot processing. Therefore, the uniform density and a complete reaction between metal powders are not achieved, which results in irregular and uncontrolled porosity of the final structure of the sintered alloy. If titanium aluminide alloys are produced in the form of thick ingots, rods, or bars, a low porosity is not critical because it can be eliminated at consequent hot forming into the final product. But in the manufacture of thin sheets or layered composites, any porosity or uneven density are final defects that hurt quality and reliability of the final product. Such defects are not acceptable after hot processing of thin sheets or layered composites made of any reactive powder alloys.

In accordance with our invention, the reactive powder alloy or the blend of elemental powders are preliminary consolidated in the porous preform having a porosity at least 25 vol.%, preferably 35-65 vol.%. The obtained stiffness and relatively uniform porosity of this preform provide a uniform application of the pressure and uniform distribution of the temperature during hot processing that result in simultaneous reaction and diffusion interaction between all powder particles. It is important also that we make said porous preform in the form of relatively thin section having a thickness and shape similar to the final product.

Thus, only a combination of making the porous thin-section preform with subsequent one or multistage hot pressing, hot rolling, HIPing, and/or sintering allows to obtain fully-dense thin sheets and layered composites from any reactive powder alloys, especially from titanium aluminide alloys by a cost-effective way.

Said porous preform can be formed by low-temperature loose sintering in a vacuum at 500-1000° C., or by high-temperature loose sintering in a vacuum at the temperature over 1000° C., or by low-pressure sintering in an inert gas atmosphere at 1000-1000° C., or by cold or warm pressing, or by direct powder rolling, or by any combinations thereof.

For titanium-based powder alloys and for titanium aluminide-based alloys, the preferred tempearture range of low-temperature loose sintering is 900-1000° C., and of high-temperature loose sintering is 1100-1250° C. This means that these alloys are sintered at the temperature near the transus $\alpha \Rightarrow \alpha+\gamma$ temperatures 1150-1260° C. (2100-2300° F.). According to this invention, the sintering may be carried out even at the temperature above the transus 2300-2500° F. All these sintering regimes allow to significantly seal the sintering porosity and decrease the open surface of the sintered powders. A preferential range of density of the initial sintered section is 65-75% from the theoretical density depending on the powder form and size, and also on the temperature and time of the process.

A preferential range of thickness of the initial sintered preform H is from 4 to 6 times the final desired thickness of the final product h that will be produced by the method of the present invention. This range of the initial thickness allows the production of fully dense sheet, strip, or foil with fine grain structure that provide the best mechanical properties. The ratio 2:1 between the initial H and the final h thickness also provides sufficient quality of formed material. But the ratio H:h less than 1.7:1 is not sufficient for producing fully dense thin strip or foil using the hot forming processes.

First of all, the consolidated plate-like preform having relatively uniform density allows reaching the uniform density along the resulting thin sheets after subsequent hot deformation. Secondly, the preliminary loose sintering near or above the $\alpha \Rightarrow \gamma$ transus point establishes active diffusion contacts between the powder particles. This results in the effective interaction between all components of the alloy during the subsequent hot processing. So, the final product obtained by this technology has not only uniform density, but also uniform chemical composition along the entire thin article.

Finally, the preliminary consolidation by loose sintering makes it possible to manufacture layered metal composites that cannot be produced by hot deformation of not consolidated powders.

The preliminary consolidation of powders before hot deformation can also be carried out by any one method selected from low-temperature or high-temperature loose sintering, low-pressure sintering, cold pressing, direct powder rolling, isostatic or die pressing, and other means of room temperature and/or warm temperature consolidation.

Hot pressing, hot rolling, and/or HIPing perform the hot deformation of the resulting porous preform after loose sintering to increase the final density of the sintered product. Temperature and pressure values depend on the size, shape, morphology, and chemistry of powder particles and on the shape and the required density of sintered sheets.

Hot pressing is carried out at the temperature range of 950-1700° C., preferably at 1250-1450° C., and at pressure in the range of 50-350 kg/cm$^2$. Within these ranges, the exact working mode "time-pressure-temperature" was determined experimentally for successful pressing of both atomized powder alloys and elemental powder blends of titanium aluminides. Those proprietary technological regimes are considered as a subject of "know-how".

Hot pressing can be performed in a solid graphite die or in a "flexible" die filled with graphite flakes. The graphite flakes behave as a liquid at the working temperature above 1000° C. and realize a sort of hydraulic effect during pressing. This effect allows adjusting the die surfaces to the surfaces of pressed porous preform to apply the uniform pressure along the treated article during the hot deformation. This approach is especially useful for the manufacture of large thin sheets or layered composites.

Hot isostatic pressing can be used for hot forming the preform into the thin sheet itself or, to the hot pressing stage to eliminate a density gradient and obtain the uniform density along the resulting article. The density gradient sometimes appears in the pressed sheets, and it is caused by nonparallel die surfaces, if dies are made from solid graphite. The combination of hot pressing with HIPing is also useful for the manufacture of large thin sheets or layered composites.

The HIP is carried out at the temperature in the range of 1250-1350° C., with the pressure in the range of 15000-40000 psi depending on the treated alloy and the shape and thickness of the resulting articles.

Hot rolling or extrusion of the porous preform is carried out at the temperature in the range of 1100-1450° C. before HIPing. Either, hot rolling or extrusion can be used for forming the final thickness of the thin sheet from the starting thickness of the porous preform, or as an additional treatment after hot pressing to improve density and shape of the hot-pressed semi-product. Hot rolling or extrusion can be performed in a vacuum, in a shielded atmosphere, or being encapsulated in a metal container to protect against oxidation.

The porous pre-sintered preform can be manufactured from the alloyed powders and/or blended elemental powders produced by atomization, plasma rotated electrode process, mechanical alloying, and other means, hydrogenated powders, and/or from combination thereof. For example, TiAl preform is pre-sintered from titanium and aluminum powders blended in the ratio appropriate to the desirable composition of γ-TiAl or Ti3Al alloy. Elemental powders provide lower cost approach that is important for our cost-effective technology.

Titanium hydride powder can be used to supplant Ti powder in the blend or in the mixture with titanium powder. Titanium hydride improves the sinterability of powder blends, enhances the oxidation resistance of the powders during sintering, and in addition, the cost of titanium hydride powder is less than the cost of pure titanium powder.

Any powder of reactive alloys and metals can be used in the form of hydride in the raw powder mixture, and/or is hydrogenated prior to forming porous preform, and/or the porous preform is hydrogenated prior to hot pressing or prior to HIPing. Hydrogenation activates sintering of the preform by enhancing diffusion processes due to cleaning surface of particles during hydrogen evaporation. At high temperature stage of hot pressing, hydrogen dissociates from the titanium hydride and aids in protecting the preform against oxidation.

The raw reactive powder alloys and elemental powder blends may contain alloying elements such as V, Mo, Ni, Nb, Mn, B, Si, and others to manufacture sheets, strips, and foils of multicomponent Ti-based and TiAl-based alloys using our innovative technology.

For instance, a sheet of the γ-titanium aluminide alloy Ti-48-4-2 having the composition of Ti-48Al-4Nb-2Mn-0.5Si can be made from the atomized true alloy or from the blend of titanium (or titanium hydride), aluminum, niobium, and manganese powders. The use of elemental metal blends significantly cut production costs, and our invention benefits this approach. Our experience showed that the correct sequence of hot pressing, HIPing, and the final heat treatment results in uniform chemical composition along the obtained thin sheets manufactured from multicomponent alloys, whether or not the porous preform was prepared from atomized alloy or from elemental metal blend.

Any reinforcing particulate or fiber-like components may be added in the raw powder mixtures to manufacture the initial preform and improve the mechanical characteristics of thin sheets obtained after the appropriate hot processing. Ceramics such as titanium diboride, silicon carbide, silicon nitride, alumina, chromium oxide, amorphous silica, and/or metals such as tungsten, hafnium, niobium, molybdenum, their alloys, and/or other ceramics, metals and alloys, and/or combination thereof. For example, a sheet 3 mm thick of metal matrix composite having a matrix of above mentioned Ti-48-4-2 alloy reinforced with 1.2 wt. % of $TiB_2$ particles, was made by using the invented method from elemental powder blend included 1.2 wt. % of $TiB_2$ powder.

This invention can also be used for manufacturing multi-layer composite sheets consisting of sintered together layers of titanium and any titanium alloys such as Ti-6Al-4V alloy, α-titanium aluminide alloy, β- titanium aluminide alloy, and γ-titanium aluminide alloy in any combinations.

Thus, the invented method makes it possible to manufacture a multilayer metal composite in the same technological cycle as a sheet of reactive metal. For instance, a graded metal composite consisting of 7 layers: titanium, Ti-6Al4V alloy, Ti3Al, γ-TiAl, Ti3Al, Ti-6Al-4V alloy, and titanium was produced using preliminary sintering of the layered porous preform, hot pressing, HIPing, and diffusion annealing.

Preparation of the porous composite preform can be performed a number of ways: (1) by individual loose sintering any one layer of the composite and assembling them in the desired order; (2) by consequent applying of appropriate metal and alloy powders and/or their hydrides one on top of the other before consolidating by loose sintering, low-pressure sintering, cold pressing, or direct powder rolling; or (3) by combination of these (1) and (2) approaches by using together pre-sintered and powdered layers placed in any desired order. The prepared package of layered preforms is then subjected to hot pressing, HIPing, and diffusion annealing.

The preparation of porous layered preform plays an especially important role in the manufacture of sintered multilayer composites. First of all, by using this approach, we can reach uniform density and microstructure within each layer along the composite sheet. Secondly, the porous structure of each layer of the composite preform facilitates joining the layers during the hot pressing or HIPing. Thus, the invented method provides the manufacture of fully dense layered composites, which mechanical and physical properties are controlled by changing the sequence and materials of the layers.

Re-sintering or diffusion annealing of the deformed composite is the finalizing step of the structure control. This procedure completes densification, forms additional strengthening intermetallics, secures the final grain size and size of dispersed phases, and releases residual stresses from the previous deformation. This treatment can be also used to increase the grain size and the size of dispersed phases if necessary.

Thus, the essence of the innovative processing chain "loose sintering of the porous preform → deformation by hot pressing or hot rolling → hot calibration by HIPing → re-sintering or diffusion annealing" is the formation of large, thin sheets of reactive metals having uniform density and microstructure.

EXAMPLE 1

The CP titanium powder having a particle size of −100 mesh was loose sintered at 1210° C. (2200 F.) in the flat preform measuring 6"×12"×0.525". The porous structure having a density of 35-38% resulted after the loose sintering was hot pressed at 1250° C. and 150-200 kg/cm² for 1 h. The pressure was maintained from 12 to 150 kg/cm² during the heating process that ranged from room temperature to 1250° C. The obtained titanium sheet 0.125" thick was fully dense with a measured density of 4.45-4.47 g/cm³, which is over 99% of the theoretical value.

Samples 3"×0.5" were cut from the edge and central part of the sheet to measure Vickers microhardness and ultimate tensile strength.

The particle size of the titanium powder, size of loose-sintered porous pre-forms, and size of samples for mechanical testing were the same in all examples described below.

Mechanical properties of the composites are shown in Table 1.

EXAMPLE 2

The same porous preform as in Example 1 was manufactured from pre-alloyed TiAl powder by low-temperature loose sintering at 850° C. The porous structure having a density of 42-45% resulted after the loose sintering was hot pressed at 1350° C. and 150 kg/cm² for 30 min. The pressure was maintained from 30 to 150 kg/cm² during the heating process that ranged from room temperature to 1350° C. The obtained titanium aluminide sheet 0.125" thick was fully dense with a measured density of 3.6 g/cm³, which is over 99% of the theoretical value.

EXAMPLE 3

The same porous preform as in Example 2 was manufactured from 50 at.% Ti and 50 at.% Al elemental powder blend by low-temperature loose sintering at 850° C. The porous structure having a density of 65-67% resulted after the loose sintering was hot pressed at 1350° C. and 150 kg/cm². The pressure was maintained from 30 to 150 kg/cm² during the heating process that ranged from room temperature to 1350° C. The resulting titanium aluminide sheet 0.125" thick was fully dense with a measured density of 3.61 g/cm³, which is over 99% of the theoretical value.

EXAMPLE 4

The same porous preform as in Example 3 was manufactured from 50 at.% Ti and 50 at.% Al elemental powder blend by low-temperature loose sintering at 850<sup>2</sup>0 C. The porous structure having a density of 65-67% resulted after the loose sintering was hot pressed at 1350° C. and 150 kg/cm² during 30 min. The pressure was maintained from 30 to 150 kg/cm³ during the heating process that ranged from room temperature to 1350° C. The resulting titanium aluminide sheet 0.125" thick was subjected to HIPing at 1250° C. and 20000 psi and annealed for 2 h at 1000° C. The resulting TiAl sheet 0.1 " thick was fully dense with a measured density of 3.62 g/cm³ which is ~100% of the theoretical value.

EXAMPLE 5

The same porous preform as in Example 4 was manufactured from 50 at.% Ti and 50 at.% Al elemental powder blend by high-temperature loose sintering at 1050° C. The porous structure having a density of 70-72% resulted after the loose sintering was hot pressed, HIPed and annealed at the same mode as in Example 4. The resulting TiAl sheet 0.1" thick was fully dense with a measured density of 3.62 g/cm³ which is ~100% of the theoretical value.

EXAMPLE 6

The same porous preform as in Example 3 was manufactured from 50 at.% Ti and 50 at.% Al elemental powder blend by low-temperature loose sintering at 850° C. The porous structure having a density of 65-67% resulted after the loose sintering was hot pressed at 1350° C. and 150 kg/cm² during 30 min. The pressure was maintained from 30 to 150 kg/cm³ during the heating process that ranged from room temperature to 1350° C. The resulting titanium aluminide sheet 0.125" thick was subjected to HIPing at 1250° C. and 20000 psi and annealed for 2 h at 1000° C. The resulting TiAl sheet 0.1 " thick was fully dense with a measured density of 3.62 g/cm³ which is ~100% of the theoretical value.

EXAMPLE 7

The same porous preform as in Example 2 was manufactured by low-temperature loose sintering at 900° C. from a powder mixture containing 40 wt. % of TiAl alloy powder produced by plasma rotated electrode process, 30 wt. % of elemental Ti and Al powder blend, and 30 wt. % of hydrogenated TiAl alloy powder. The porous structure having a density of 46-48% resulted after the loose sintering was hot pressed for 40 min at 1350° C. and 150 kg/cm². The pressure was maintained from 30 to 150 kg/cm² during the heating process that ranged from room temperature to 1350° C. The resulting titanium aluminide sheet 0.125" thick was fully dense with a measured density of 3.6 g/cm³, which is over 99% of the theoretical value.

EXAMPLE 8

The porous flat preform measuring 6"×12"×0.525" of the metal matrix Ti-48Al-4Nb-2Mn-0.5Si alloy reinforced with 1.2 wt. % of $TiB_2$ particles was manufactured from Ti, Al, Nb, Mn, Si, and $TiB_2$ elemental powder blend by low-temperature loose sintering at 850° C. The porous structure having a density of 62-66% resulted after the loose sintering was hot pressed at 1350° C. and 200 kg/cm² during 30 min. The pressure was maintained from 30 to 200 kg/cm³ during the heating process that ranged from room temperature to 1350° C. The obtained γ-titanium aluminide composite sheet 0.125" thick was subjected to HIPing at 1250° C. and 20000 psi and annealed for 2 h at 1050° C. The resulting metal matrix composite sheet 0.1" thick was fully dense with a measured density of 4.33 g/cm³, which is over 99% of the theoretical value.

TABLE 1

Physical and mechanical properties of thin sheets of manufactured by invented method

| Example | Alloy | Density, g/cm³ | Vickers microhardness, HV | Ultimate tensile strength, MPa (ksi) |
|---|---|---|---|---|
| 1 | CP Ti | 4.45-4.47 | 2340 | 243-260 (35.2-37.7) |
| 2 | TiAl | 3.60 | 5200 | 459-474 (66.5-68.9) |
| 3 | TiAl | 3.61 | 5600 | 503-512 (72.9-74.2) |
| 4 | TiAl | 3.62 | 5800 | 518-532 (75.1-77.2) |
| 5 | TiAl | 3.62 | 4400 | 391-399 (56.6-57.8) |
| 6 | TiAl | 3.62 | 4900 | 435-448 (63.0-64.9) |
| 7 | TiAl | 3.60 | 5360 | 496-511 (71.9-74.0) |
| 8 | Ti-48Al-4Nb-2Mn-1.2TiB₂ | 4.33 | 6400 | 581-593 (84.2-85.9) |

EXAMPLE 9

The flat porous preform measuring 6"×12"×2.125" of layered metal composite was manufactured by layering titanium, Ti-6Al-4V alloy, Ti3Al, γ-TiAl, Ti3Al, Ti-6Al-4V alloy, and titanium powders (each layer ~0.3" thick) followed by low-temperature loose sintering at 900° C. The prepared package of layered porous structures having a density from 35 to 65% was subjected to hot pressing at 1350° C. and 150 kg/cm$^2$ for 30 min and annealed for 2 h at 1050° C. The resulting metal matrix composite sheet 0.875" thick was fully dense with a measured average density of 98.7% of the theoretical value.

We claim:

1. A method for manufacturing fully dense sheets, strips and layered composites from reactive alloys comprising the following steps:
   (a) forming a porous preform of a reactive powder alloy or a porous multi-layer composite preform consisting of reactive powder metals and alloys by consolidation using at least one method selected from low-temperature loose sintering in vacuum, high-temperature loose sintering in vacuum, low-pressure sintering in an inert gas, cold pressing, direct powder rolling, isostatic or die pressing, and other means of room temperature and warm temperature consolidation, and/or combination thereof, to provide a density not less than 25% from theoretical density of said reactive alloy;
   (b) hot consolidating by hot pressing, hot rolling, hot isostatic pressing, or hot extrusion of said preform to obtain a density of 98-100% from the theoretical density of said reactive alloy;
   (c) hot isostatic pressing (HIP) carried out after hot pressing to eliminate a density gradient and to obtain the a uniform density along a resulting metal sheet;
   (d) annealing at the a temperature being at least 900° C. to decrease residual porosity, control microstructure, and improve ductility, plasticity or other mechanical properties of the resulting metal sheets or layered composites.

2. The method according to claim 1, wherein the reactive powder alloys are manufactured from alloyed powders and/or blended elemental powders produced by atomization, plasma rotated electrode process, mechanical alloying, and/or by combination thereof.

3. The method according to claim 2, wherein the blended elemental powders are selected from titanium, aluminum, and titanium hydride powders in any combinations.

4. The method according to claim 1, wherein any powder of said reactive alloys and metals can be used in form of hydride in a raw powder mixture, and/or is hydrogenated prior to forming said porous preform, and/or said porous preform is hydrogenated prior to hot pressing or prior to HIP.

5. The method according to claim 2, wherein said reactive powder alloys and elemental powder blends contain one or more of the alloying elements vanadium, molybdenum, nickel, niobium, manganese, boron, silicon, or other elements to obtain multi-component titanium aluminide-based alloys.

6. The method according to claim 1, wherein, before compacting in the preform, the reactive powder alloy is mixed with a reinforcing particulate and/or fiber component having a melting temperature higher than that of hot pressing or HIP and consisting of ceramics such as titanium diboride, silicon carbide, silicon nitride, alumina, chromium oxide, amorphous silica, and/or metals such as tungsten, hafnium, niobium, molybdenum, their alloys, and/or other ceramics, metals and alloys, and/or combination thereof.

7. The method according to claim 1, wherein the multilayer composite consists of layers of titanium and/or titanium hydride, Ti-6Al-4V alloy, α-titanium aluminide alloy, β-titanium aluminide alloy, and γ-titanium aluminide alloy in any combinations.

8. The method according to claim 1, wherein the multilayer composite consists of the following sequence of layers: titanium, Ti-6Al-4V alloy, α-titanium aluminide alloy, γ-titanium aluminide alloy, α-titanium aluminide alloy, Ti-6Al-4V alloy, and titanium.

9. The method according to claim 1, wherein the layered composite preform is manufactured by layering appropriate metal and alloy powders and/or their hydrides and consolidating by loose sintering, low-pressure sintering, cold pressing, direct powder rolling, isostatic or die pressing, and other means of room temperature and warm temperature consolidation, and/or combination thereof.

10. The method according to claim 9, wherein the layered composite preform is manufactured by individual loose sintering, one layer of a composite at a time, and assembling them in the desired order.

11. The method according to claim 9, wherein the layered composite preform is manufactured by using both pre-sintered and powdered layers placed in any desired order.

12. The method according to claim 1, wherein said low-temperature loose sintering is carried out at temperature ranging from 500-1000° C.

13. The method according to claim 1, wherein said high-temperature loose sintering is carried out at temperature over 1000° C.

14. The method according to claim 1, wherein said hot pressing is carried out at the temperature ranging from 950-1700° C., and at pressure ranging from 50-350 kg/cm2.

15. The method according to claim 1, wherein hot pressing is carried out in a solid graphite die.

16. The method according to claim 1, wherein hot pressing is carried out in die filled with graphite flakes or graphite powder.

17. The method according to claim 1, wherein said hot isostatic pressing is carried out at temperature ranging from 1250-1350° C. and at pressure ranging from 15000-40000 psi.

18. The method according to claim 1, wherein said hot rolling and extrusion are carried out at temperature ranging from 1100-1450° C.

* * * * *